United States Patent [19]

Goll

[11] Patent Number: 4,608,108

[45] Date of Patent: Aug. 26, 1986

[54] WET-END MOLDING METHOD AND MOLDED PRODUCT

[75] Inventor: John D. Goll, Largo, Fla.

[73] Assignee: The Celotex Corporation, Tampa, Fla.

[21] Appl. No.: 754,316

[22] Filed: Jul. 12, 1985

Related U.S. Application Data

[63] Continuation of Ser. No. 440,042, Nov. 8, 1982, abandoned.

[51] Int. Cl.$^4$ .................... D04H 3/08; B31F 1/00; D21F 13/00; B29C 59/00
[52] U.S. Cl. .................... 156/219; 156/246; 156/181; 162/223; 162/225; 264/119
[58] Field of Search .......... 156/298, 180, 181, 219, 156/196, 220, 246, 221; 264/112, 113, 119, 257; 428/268, 312.6, 438, 440, 375, 311.7, 311.1, 549; 162/3, 222, 115, 117, 123, 145, 223

[56] References Cited

U.S. PATENT DOCUMENTS

| | | | |
|---|---|---|---|
| 2,402,966 | 7/1946 | Linzell | 92/38 |
| 2,890,540 | 6/1959 | Britt | 41/24 |
| 3,042,577 | 7/1962 | Thomas | 162/115 |
| 3,379,608 | 4/1968 | Roberts et al. | 162/145 |
| 3,848,043 | 11/1974 | Garrick et al. | 264/119 |
| 3,949,035 | 4/1976 | Dunning et al. | 264/119 |
| 4,007,076 | 2/1977 | Clarke et al. | 156/219 |
| 4,072,558 | 2/1978 | Akerson | 162/145 |
| 4,134,948 | 1/1979 | Baker, Jr. | 162/117 |
| 4,153,503 | 5/1979 | Booth et al. | 162/123 |
| 4,238,190 | 12/1980 | Rejto | 156/219 |
| 4,263,093 | 4/1981 | Shenk | 264/119 |
| 4,283,457 | 8/1981 | Kolsky et al. | 428/312.6 |
| 4,338,368 | 7/1982 | Dotts et al. | 428/312.6 |
| 4,469,656 | 9/1984 | Ishii | 264/87 |

FOREIGN PATENT DOCUMENTS

1012254  12/1965  United Kingdom .

*Primary Examiner*—Edward Kimlin
*Assistant Examiner*—Lou Falasco
*Attorney, Agent, or Firm*—James W. Grace; Charles W. Vanecek

[57] ABSTRACT

A method for producing a fibrous board having a decorative, textured surface comprising the steps of:
  (a) forming a wet mat of entangled mineral fibers;
  (b) pressure molding said fibrous mat while it is still wet to create a decorative textured surface thereon; and
  (c) drying said board.

14 Claims, 2 Drawing Figures

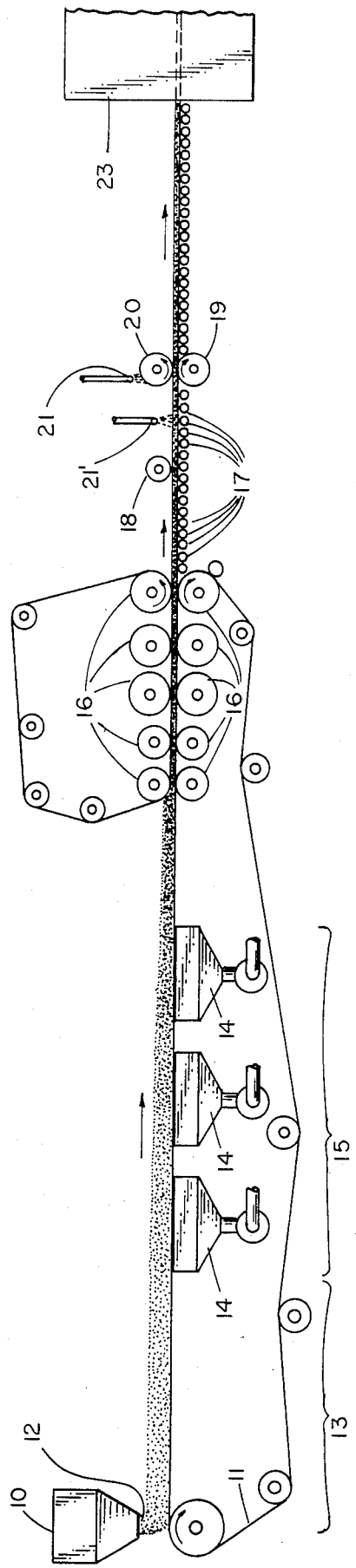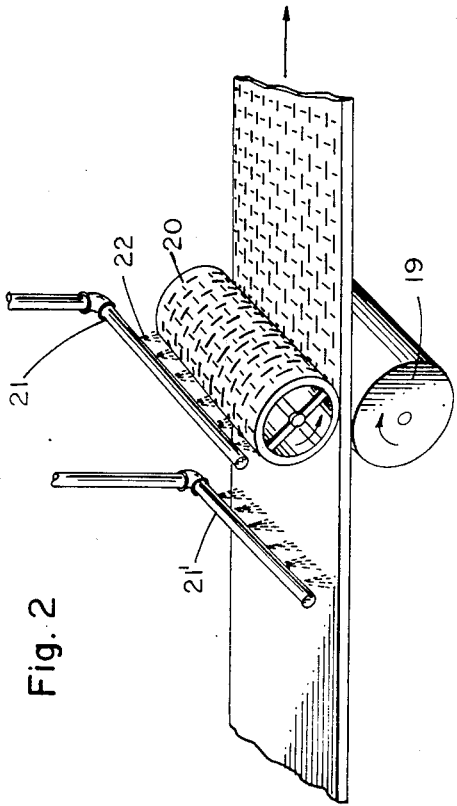

WET-END MOLDING METHOD AND MOLDED PRODUCT

This is a continuation of application Ser. No. 440,042, filed Nov. 8, 1982 now abandoned.

BACKGROUND OF THE INVENTION

1. Field of the Invention

This invention relates to a method for molding wet-felted fibrous material, and to the molded product produced by this method. More particularly, this invention relates to a method of molding a textured pattern of high fidelity on a wet-felded, mineral fiber-containing mat while the mineral fibers are in a wet and highly entangled condition.

2. Description of the Prior Art

The practice of embossing textured patterns and designs on the surfaces of ceiling tiles, ceiling panels and other substrates is widespread and the art of imparting a decorative appearance to these products is greatly varied. One basic technique in common usage is to employ an embossing plate or roll which impresses the pattern into the surface of a dry substrate, thereby often causing the surface to become crushed. Other conventional methods employed, such as cutting, abrading, or routing out a portion of the surface of the substrate, also involve deformation of the substrate.

The usual prior art methods of pattern embossing therefore generally entail the deformation, by pressure or other means, of the substrate. In the process, the fibers of the substrate become fragmented. Also, the binder loses its cohesiveness due to the fragmentation resulting from the pressure of the embossing plate or roll. As a result, the substrate becomes weak and vulnerable to humidity and the force of gravity. This weakening can cause the substrate to have poor dimensional stability and to sag from the ceiling if it is a ceiling panel or tile.

The current commercial practice in producing textured patterns on mineral board by dry embossing is to emboss a pattern on the dried core to a depth of about 0.045 inch to 0.065 inch by wetting the dry core surface with water, and then embossing by means of a hot roll. Due to fracturing of the mineral fibers, a significant loss in core strength results. A costly backsizing then is required to restore board handleability and high humidity sag properties. However, in the case of "deeply" embossed patterns of 0.100 inch to 0.200 inch, the loss in strength is so large that even backsizing will not help.

Another disadvantage associated with the prior art methods involving cutting, routing, and abrading is that they produce dust, thus creating a health and explosion hazard to workers. Complicated and expensive dust collection systems are required to cope with these hazards.

It would be highly desirable if an improved method of molding a textured pattern on a substrate could be found which is relatively simple and yields a molded substrate having superior strength and a highly detailed pattern on its surface.

OBJECTS OF THE INVENTION

It is therefore an object of the present invention to provide an improved molded substrate and method, whereby a wet-felted fibrous material containing mineral fibers is subjected to a molding device to yield a molded board having a well-defined pattern.

It is another object of the present invention to provide a molded, mineral fiber containing board which is characterized by excellent board strength.

It is still another object of the present invention to prepare a molded board product containing mineral fibers by an improved method of molding wet-felted fibers which minimizes board deformation and avoids to a significant degree the shearing of fibers and breakage of inter-fiber bonding which occurs during dry molding.

It is a further object of the present invention to provide a new and economical method of manufacturing molded, mineral fiber containing board products, which method is characterized by the ability to quickly change designs during production and to produce a wide variety of pattern designs for both commercial and residential applications.

It is a still further object of the present invention to provide an energy efficient method of manufacturing molded mineral board products, which method is capable of avoiding the costly, energy consuming hot roll embossing involved in dry end embossing.

Other objects and advantages of the present invention will become apparent to those skilled in the art when the instant disclosure is read in conjunction with the accompanying drawings.

SUMMARY OF THE INVENTION

The above objects have been achieved in the molded board product and method of the present invention, wherein a wet-felted material containing mineral fibers is molded to yield an embossed board having a particularly high degree of pattern fidelity. A wet felted mat containing intermingled mineral fibers is formed by conventional means on a suitable forming machine, e.g., a Four-drinier or a cylinder machine. The wet mat which exits from the mat-forming machine is impressed by a molding roll or other suitable molding means with a decorative textured pattern. Even though the mineral mat contains approximately 60-70% water by weight, high fidelity patterns are obtained. This is surprising because poor pattern reproduction would be expected due to the soft and interweaved condition of the wet mat before molding. The molded board of the invention is further characterized by superior strength values, which, it is theorized, result from the non-destructive shaping of the mineral fibers while in the wet, non-rigid state. The wet-end method of the invention for producing molded mineral fiberboard typically includes the following steps: forming an aqueous suspension of the board-forming ingredients; subjecting the aqueous suspension to a drainage means to form a wet mat; cold pressing the mat to further dewater and consolidate it; further pressing the cold pressed wet mat by a patterned roll(s) to produce a molded board; drying the molded board; and fabricating and finishing the board as desired.

DESCRIPTION OF THE DRAWINGS

The invention will now be described with reference to the accompanying drawings in which:

FIG. 1 is a diagrammatic, side elevational view of an apparatus for carrying out the method of the present invention; and FIG. 2 is a perspective view of devices for spraying water onto the embossing roll and production line of FIG. 1.

DETAILED DESCRIPTION OF THE INVENTION

The composition to be molded in accordance with the present invention contains a mineral fiber component as the essential ingredient thereof. The mineral fiber component includes wool or fibers formed from rock, slag, fused glass, glass mixtures thereof and other heat liquefiable raw materials capable of being converted into fibers. The mineral fibers usually have a ratio of length to diameter which is equal to 10 or higher, with lengths which vary between 0.1 and 100 mm, more typically between 1 and 10 mm, and diameters within the range of 0.1 to 25 microns. Mineral fibers having lengths in the range of about 1 to 5 mm have been found especially useful in the present invention. The moldable composition also desirably contains cellulosic fibers and a binder. The composition may comprise about 20% to 85% mineral fibers and about 5% to 50%, preferably 15% to 30%, cellulosic fibers, and the binding agent in an amount sufficient to form the embossed board of the invention, as, e.g., about 5% to 15%.

The cellulosic fibers may be wood fibers, primary or secondary paper fibers, cotton linters or the like. The fiber length will generally be up to about ¼ inch in length. Highly desirable fibers for use in the present invention are newsprint fibers which will generally have a length of from about ¼ millimeter to about 5 millimeters with an average length of about 1 millimeter.

Numerous materials may be used as binding agents in the board-forming composition of the invention. Useful binders include starch, chemically modified starches, phenol-formaldehyde or other artificial resin binders, sodium silicate, glue, casein, rubber latex, aqueous rubber dispersions or emulsions, asphalt emulsions, or combinations thereof.

A wide variety of fillers can be employed in the moldable, mineral fiber containing composition of the invention. The preferred fillers are those which are inorganic. The filler or fillers generally constitute about 0 to 20, more preferably about 0 to 10, weight percent of the moldable composition. Examples of suitable fillers include calcium carbonate, plaster and gypsum, silica, sericite, natural clay, such as kaolin, bentonite or ball clay, talc, mica and other silicates. Advantageously, the composition contains about 5% to 50% of expanded perlite particles, which suitably have a density in the range from about 3.0–8.0, preferably 5.0–8.0, pcf.

The moldable composition additionally may contain other auxiliary substances useful in conventional mineral fiberboard-forming compositions, such as preservatives, wetting agents, defoamers, and flocculents. The amounts of such auxiliary additives can be readily determined by those skilled in the art.

A typical formulation for formation of the embossed board of the present invention is as follows:

| Ingredient | Typical (%) | Range (%) | Preferred Range (%) |
| --- | --- | --- | --- |
| Mineral Wool | 49.0 | 20–85 | 40–60 |
| Clay | 11.0 | 0–20 | 0–15 |
| Perlite | 17.0 | 5–50 | 15–40 |
| Cellulose | 15.0 | 5–50 | 15–30 |
| Starch | 8.0 | 5–15 | 5–10 |
| Flocculent | 0.08 | 0–0.10 | — |

Referring now to FIG. 1 of the drawings, the mineral fiber containing composition of the invention is slurried to a solids content of from about 2% to about 6%, and the slurried composition is introduced to head box 10. The slurry, consisting of about 20% to 90% dry weight of feltable fibers, is subsequently deposited on Fourdrinier wire 11 through orifice 12 of head box 10. The first section 13 of the Fourdrinier wire permits free drainage of water from the material and further drainage is promoted by suction boxes 14 in section 15. As the slurry is brought in contact with the Fourdrinier machine and water of the slurry drains therefrom, a wet felted mat of the mineral fiber composition forms on the machine. The wet laid mat is dewatered by the Fourdrinier machine to a solids content of about 15 to 25 weight percent.

The partially dried material is then prepressed to a thickness of about 0.4 to 0.8 inch by a plurality of press rolls 26. It will be appreciated that a single set of press rolls could be employed if desired. After being pressed, the sheet product will generally have from about 50 to about 75% water. Optimum wet molding results have been achieved when the wet mat moisture before molding is kept below about 69.5%. It is also possible to avoid the prepressing operation by molding the wet laid mat directly after its formation. In another embodiment of the present invention, a roll coater 18 may be stationed on the production line before the molding device(s) to precoat the wet mat before molding. This precoating may be used to help increase pattern fidelity.

After passing through press rolls 16, the wet mat is then passed via conveyor rolls 17 to the molding device(s). Various molding means, such as a patterned plate(s), a molding roll(s), etc., can be utilized to impress a deep, well-defined, molded pattern into the mat. Roll molding is found to be a particularly desirable technique because of its speed, economy, and adaptability in permitting pattern changes during production. In practice, the mat is conveyed at a line speed of between about 20 to 50 linear feet per minute between the two rolls 19 and 20. Bottom anvil roll 19 has a fixed axis. Above roll 19 is the molding or embossing roll 20 which has a suitable decorative pattern thereon. Molding roll 20 has its axis vertically movable and control means (not shown) are provided for pressing roll 20 against the moist felted mat whereby the roll's pattern is transferred to the mat. In an alternate embodiment, the top molding roll 20 may be stationary while roll 19 moves vertically to adjust the distance between the two rolls. Rolls 19, 20 move at a speed that is preferably exactly the same as that at which the endless felted mat is being advanced. Molding roll 20 is commonly unheated, but also can be heated in the range of approximately 100° C. to 400° C. The pressure used in molding roll 20 is typically from about 2 to about 50 p.s.i. Pattern detail can be enhanced through increased roll pressure upon the mineral fiber mat. In a preferred embodiment for a nominal ⅝ in thick product, the wet mat thickness before molding is at least about 0.57 in and a reduction in mat thickness of about 0.04 to 0.07 in is effected during the molding operation to ensure good pattern reproduction. The method of the invention is capable of yielding patterns which are in the range of about 0.025–0.20 in deep.

Molding roll 20 is suitably an iron or steel roll having its outer surface layer provided with the pattern in relief corresponding to the impression which it is desired to give the wet mat. The patterned surface layer of roll 20 advantageously comprises any suitable substance which, when pressed into the wet mineral fiber-containing mat, resists any appreciable material pickup and pattern deformation. Both yielding surfaces and hard and unyielding surfaces, such as engraved metal, can be utilized. Preferred cover layers for the molding roll are made of a rubber, such as Silastic E RTV rubber available from Dow Corning Corporation, or polyurethane material. Wear of a roll covering made of polyurethane or similar material can be minimized by rotating the roll at the speed of the advancing felted mat and exerting only enough roll pressure to produce a good pattern. Manufacture of the patterned cover layer can be accomplished in a conventional manner, as, e.g., by introducing the rubber- or urethane-forming ingredients or the like into a mold and curing the ingredients to form the patterned layer, which is thereafter affixed by conventional means, as, e.g., by a suitable adhesive, such as a rubber contact cement, an epoxy resin adhesive or similar resin adhesive, to the molding roll.

As shown in FIG. 2, a suitable device 21 for directing a spray or mist of water 22 onto molding roll 20 is advantageously located above the roll. Water spray pipe 21 can be mounted approximately 18 inches above molding roll 20 and operated at about 30 p.s.i. to produce a water spray mist over the molding roll during the molding operation at a rate of about 3–4 gal/min. Another spray pipe 21' can be arranged to apply water to the mat somewhat in advance of molding roll 20. Water application to the molding roll and/or mat is employed to aid in the clarity and depth of transfer of the molded pattern and to reduce the roughness of the molded surface. The amount of water to be applied can vary over a wide range but generally is from about 30 pounds per thousand board square feet to about 80 pounds per thousand board square feet.

After the molding step, the molded product is transferred into dryer 23. At the outlet of the dryer, there is obtained a molded fiberboard having a moisture content of less than about 0.5%. The dried product can be subjected to any suitable conventional finishing apparatus, depending on the applications for which it is intended. Such apparatuses include a saw arrangement for cutting the product into smaller panels, applicators for applying coatings to protect and/or decorate the product surface, such as bevel coats, finish spray coats, printing inks, multi-color decorative coatings, and the like, and further drying equipment.

In accordance with the process of the present invention, the mineral fiber-containing composition is typically formed into a molded fiberboard of from about 0.4 to 0.8 inch thick, preferably from about 0.55 to 0.65 inch thick, and having a density of from about 10 to 25 pounds per cubic foot, preferably from about 13 to 18 pounds per cubic foot.

The present invention provides a novel method to mold deep patterns into mineral lay-in panels using board machine mounted patterned rolls. Board thickness recovery in the dryer has little effect upon reducing the pattern detail impressed into the wet felted mineral fiber mat by the molding roll(s). The deep impression obtained during the embossment of the mat while the mineral fibers are in a wet and highly interlaced condition is surprisingly maintained in the finished fiberboard even though the natural tendency of the indented portions of the fibrous material is to spring back and hence result in shallow, non clear-cut patterns.

Besides producing a highly decorative, deep textured mineral product, the present process of molding wet felted mineral core helps to reduce significantly the amount of structural damage caused by dry end fissuring. The method allow for improved final strength of the board produced due to actual molding of the fibers to form a pattern shape, thus causing only limited damage to the fibers and to the fiber to fiber bonding. Fissuring and/or embossing of dry, finished core board destroys this important inter fiber bonding, thereby reducing final board strength and resistance to various physical conditions, which may be evidenced, for example, by the sag of panels from a ceiling. The method of the invention thus yields a molded fiberboard product which is characterized by excellent board strength, as evidenced, e.g., in high values on breakstrength, good dimensional stability, increased warp and sag resistance, etc.

The invention also permits a reduction in the costs of pattern production, and makes it possible to quickly change pattern designs. This is because the instant molding step can be carried out with the use of an unheated, relatively small diameter roll having a replaceable patterned covering of rubber, polyurethane or the like. This type of molding equipment is much easier and cheaper to replace or modify than the heavy, large diameter, engraved metal rolls typically used in dry end embossing. A wide variety of pattern designs, suitable for both commercial and residential ceiling products, can be used in forming the decoratively molded boards of the present invention. Additionally, the present method is simple and economical, and is capable of avoiding the high energy consumption associated with hot roll embossing.

The present invention is further illustrated by the following example in which all percentages are by weight.

EXAMPLE

This example illustrates with reference to FIGS. 1 and 2 of the drawings the production in accordance with the present invention of wet-molded fiberboard containing mineral fiber.

The formulation utilized in manufacturing the product of this invention consisted of the following ingredients in the listed percentages by weight:

| Ingredient | % |
| --- | --- |
| Mineral Wool | 50.4 |
| Clay | 6.4 |
| Perlite | 19.7 |
| Newsprint | 14.9 |
| Starch | 8.6 |

The ingredients were diluted with water to form a slurry, and the slurry was deposited on Fourdrinier wire 11. The slurry was dewatered in a conventional manner on the Fourdrinier machine to form a wet felt or mat of interlocked fibers. The partially dewatered fibrous mat was next passed through a press section comprising pressing rolls 16, which densified the mat and provided a wet mat of uniform thickness (about 0.57 inch) with a moisture content of about 69.5%.

After leaving the press section, the wet mat was passed on roller conveyors 17 between molding roll 20 and anvil roll 19. Molding roll 20 was a 15 inch diameter steel roll and its roll surface consisted of a patterned 70 durometer polyurethane cover having a thickness of about 0.38 in. Enough downward roll pressure was applied to the mat to obtain the desired pattern fidelity, but not so much as to cause mat distortion or cracking. A highly decorative, 0.125 in deep pattern was impressed into the board by molding roll 20. During the run, compressed air at relatively low pressure was occasionally directed at the molding roll to keep it clean and sharp. Rolls 19, 20 were rotated in the board-forming direction (in the direction of the arrows shown in FIG. 1), and at the same speed as the forming line. The wet board thickness after impression by molding roll 20 was about 0.53 inch.

The molded board was conveyed from molding roll 20 to dryer 23. After being dried, the board product was subjected to various conventional finishing steps, including cutting into appropriate sizes, cleaning, base coating by a Steinemann coater, and further drying and cleaning. An afterspray coating was next laid down on the board and this coating was dried. Finally, the cooled board was cut into panels and packaged for the marketplace.

Wet molded lay-in panels made in accordance with the foregoing procedure had the following physical properties:

| | |
|---|---|
| Thickness, in | 0.57 |
| Density, lb/cu ft | 16.0–18.0 |
| Transverse Strength, lb | 42 |

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

I claim:

1. A method for producing a fibrous board having a decorative, textured surface comprising the steps of:
    (a) forming an aqueous slurry of entangled mineral fibers;
    (b) dewatering said slurry to form a wet mat;
    (c) pressing said wet mat to consolidate said mat, said consolidated wet mat having from about 50 to 75% water;
    (d) pressure molding said consolidated wet mat at a pressure of about 2 to 50 psi while it is still wet by a moulding means provided with a patterned surface layer to create a decorative textured surface on said consolidated wet mat; and
    (e) drying said board.

2. The method of claim 1 wherein said step (b) is accomplished by continuously dewatering said aqueous slurry of said step (a) on a moving porous carrier capable of passing drainable water therethrough and retaining solids thereon.

3. The method of claim 2 wherein said pressure molding step (d) is accomplished by rolling pressure of a molding roll.

4. The method of claim 3 wherein, before said pressure molding step (d), a paint coating is applied to the face of said consolidated wet mat.

5. The method of claim 3 wherein water is applied to the surface of said molding roll during said pressure molding step (d).

6. The method of claim 3 wherein, before said pressure molding step (d), water is applied to the face of said consolidated wet mat.

7. The method of claim 1 wherein said wet mat comprises, on a water-free basis, about 20 to 85 weight percent of mineral fibers, 5 to 50 weight percent of cellulosic fibers, and 5 to 15 weight percent of binder.

8. The method of claim 1 wherein said wet mat, on a water-free basis, comprises:
    (a) about 20 to 85 weight percent of mineral wool,
    (b) about 0 to 20 weight percent of clay,
    (c) about 5 to 50 weight percent of perlite,
    (d) about 5 to 50 weight percent of cellulose,
    (e) about 5 to 15 weight percent of starch, and
    (f) about 0 to 0.1 weight percent of flocculent.

9. The method of claim 3 wherein said molding roll has a patterned surface layer composed of a material selected from the group consisting of rubber, polyurethane and metal.

10. The method of claim 3 wherein said molding roll is heated in the range of about 100° to 400° C.

11. A method for producing a fibrous board having a decorative, textured surface comprising the steps of:
    (a) forming an aqueous slurry of solids and water, said solids comprising:
        (i) about 20 to 85 weight percent of mineral wool,
        (ii) about 0 to 20 weight percent of clay,
        (iii) about 5 to 50 weight percent of perlite,
        (iv) about 5 to 50 weight percent of cellulose,
        (v) about 5 to 15 weight percent of starch, and
        (vi) about 0 to 0.1 weight percent of flocculent;
    (b) dewatering said slurry to form a wet mat;
    (c) roll pressing said wet mat to consolidate said mat, said consolidated wet mat having from about 50 to 75% water;
    (d) subjecting said consolidated wet mat to rolling pressure of about 2 to 50 psi of a molding roll to create a decorative textured surface thereon; and
    (e) drying said board.

12. The method of claim 11 wherein:
    (a) said slurry contains about 2 to 6 weight percent of solids before said dewatering step (b);
    (b) said consolidated wet mat contains about 50 to 69.5 weight percent of water after said roll pressing step (c); and
    (c) said molding roll has a patterned surface layer composed of a material selected from the group consisting of rubber, polyurethane and metal.

13. The method of claim 12 wherein said solids of said slurry comprise:
    (a) about 40 to 60 weight percent of mineral wool,
    (b) about 0 to 15 weight percent of clay,
    (c) about 15 to 40 weight percent of perlite,
    (d) about 15 to 30 weight percent of newsprint fibers,
    (e) about 5 to 10 weight percent of starch, and
    (f) about 0 to 0.10 weight percent of flocculent.

14. The method of claim 12 wherein water is applied to the surface of said molding roll during said pressing of said consolidated wet mat.

* * * * *